United States Patent [19]
Hackmeister

[11] Patent Number: 6,010,095
[45] Date of Patent: Jan. 4, 2000

[54] ICING DETECTOR FOR AIRCRAFT

[75] Inventor: Richard Hackmeister, Ft. Lauderdale, Fla.

[73] Assignee: New Avionics Corporation, Ft. Lauderdale, Fla.

[21] Appl. No.: 08/915,492

[22] Filed: Aug. 20, 1997

[51] Int. Cl.⁷ .................................................. B64D 15/20
[52] U.S. Cl. ...................... 244/134 F; 340/962; 340/583; 250/559.41
[58] Field of Search ...................... 244/134 F; 250/559.4, 250/559.41; 340/962, 580, 583

[56] References Cited

U.S. PATENT DOCUMENTS

| | | |
|---|---|---|
| 2,359,787 | 10/1944 | Peters . |
| 3,540,025 | 11/1970 | Levin et al. . |
| 3,543,577 | 12/1970 | Pavlov et al. . |
| 3,892,490 | 7/1975 | Uetsuki et al. . |
| 3,901,607 | 8/1975 | Kingsland . |
| 3,996,787 | 12/1976 | Edgington . |
| 4,053,127 | 10/1977 | Edgington . |
| 4,095,456 | 6/1978 | Edgington . |
| 4,210,021 | 7/1980 | Vykhodtsev et al. . |
| 4,269,192 | 5/1981 | Matsuo . |
| 4,333,004 | 6/1982 | Forgue et al. ........................... 219/497 |
| 4,461,178 | 7/1984 | Chamuel et al. ........................... 73/599 |
| 4,553,137 | 11/1985 | Marxer et al. ........................... 340/382 |
| 4,628,736 | 12/1986 | Kirby et al. . |
| 4,745,804 | 5/1988 | Goldberg . |
| 4,797,660 | 1/1989 | Rein . |
| 4,819,480 | 4/1989 | Sabin . |
| 4,980,673 | 12/1990 | Kleven . |
| 5,061,836 | 10/1991 | Martin . |
| 5,243,185 | 9/1993 | Blackwood . |
| 5,296,853 | 3/1994 | Federow et al. . |
| 5,398,547 | 3/1995 | Gerardi et al. . |
| 5,400,144 | 3/1995 | Gagnon . |
| 5,484,121 | 1/1996 | Padawer et al. . |
| 5,596,320 | 1/1997 | Barnes . |
| 5,748,091 | 5/1998 | Kim . |
| 5,760,711 | 6/1998 | Burns . |
| 5,796,106 | 8/1998 | Noackl . |

*Primary Examiner*—Peter M. Poon
*Assistant Examiner*—Tia Dinh
*Attorney, Agent, or Firm*—Burns, Doane, Swecker & Mathis, LLP

[57] ABSTRACT

According to the invention, there is provided an icing detector for detecting presence of both rime ice and clear ice in air comprising an ice collecting surface facing an oncoming air stream; light emitting apparatus for emitting a light beam crossing the ice collecting surface, having a prismatic light refracting window for refracting the light beam in a first direction, when no ice is present on the ice collecting surface; light sensing apparatus in a path of the second direction, and annunciating apparatus coupled to the light sensing apparatus for annunciating presence of ice when light is sensed by the light sensing apparatus.

17 Claims, 7 Drawing Sheets

ICING DETECTOR FOR AIRCRAFT

The invention relates to an icing detector for aircraft based on variable refraction of a light beam through ice build-up.

The invention further relates to an icing detector directed primarily for aircraft but having additional areas of application based on the difference in refraction of a light beam through the built-up ice, as opposed to its refraction through air. Simultaneously, it also detects the difference of opacity between rime ice and air, and thereby indicates presence or absence of ice aloft, and which type of ice it is.

There are two types of ice aloft: clear ice and rime ice. In the first case the invention detects clear ice by detecting the difference in refractive index (u) between clear ice (u=1.31) and air (u=1.00). In the case of rime ice, the invention simultaneously detects a difference in optical transmittance (opacity) between rime ice and air.

BACKGROUND OF THE INVENTION

Ice build-up on external aircraft structures is extremely dangerous in that it not only adds weight to the aircraft, but also it distorts the profile of lifting surfaces and impairs the function of control surfaces such as rudders, elevators and ailerons. Also, ice forming on external airspeed indicators and the like have often caused total loss of aircraft with passengers and crew, due to loss of air speed and altitude indication.

Also, during flight under auto-pilot, the forces building on the control surfaces due to unknown accumulations of ice can cause excessive forces on the control surfaces, so that the auto-pilot servo system cannot continue to respond, and it may fail, adding excessive and/or unanticipated forces abruptly to the control yoke, possibly resulting in a crash.

A considerable body of prior art has been developed over the years to provide reliable icing indicators for aircraft.

As an example, U.S. Pat. No. 4,333,004 shows an arrangement including sensor and reference wires directly exposed to the airflow past a vehicle. The wires are electrically conductive, and each has a resistance varying with its temperature. A continuous fixed voltage is passed through the reference wire. A short pulse of greater constant voltage is passed through the sensor wire, the voltage being of sufficient magnitude to cause the rapid heating of the sensor wire during the pulse. The resultant rate of heat of the sensor wire, and its final temperature at the end of the pulse, is determined by whether ice or water is on the sensor wire. Circuitry is provided to generate an ice-present signal when the difference in current flow during the pulse through the sensor wire and through the reference wire is of such magnitude and sign as to indicate that ice was in contact with the sensor wire. Due to water's heat of fusion, the effect of ice on the sensor wire is readily distinguished from the effect of water.

U.S. Pat. No. 4,553,137 shows an improved ice detector having a vibrating element which has a front portion and vibrating means suitably disposed with respect to the vibrating element for exciting the vibrating element into vibration and means for sensing a shift of the frequency of vibration of the vibrating element resulting from a change of mass of the vibrating element due to ice accumulating thereon. The improvement is characterized in that the ice detector is supported with respect to a surface exposed to an air stream such that a cap on which ice forms and which is disposed on the front portion of the vibrating element is exposed to the air stream and is formed to be substantially conformal to such surface.

U.S. Pat. No. 4,461,178 shows a system for the detection of wing icing by monitoring variations in flexural waves transmitted through the outer plate material of an aircraft airfoil. The flexural waves in the plate of the wing airfoil are more subject to variation from the accumulation of ice on the wing than the compressional waves. The flexural waves are detected apart from the compressional waves, which tend to remain relatively constant, to provide an indication of icing. Changes in amplitude, phase or dispersion characteristics of the flexural waves are detected to indicate ice buildup, and, in one embodiment, these values are ratioed to corresponding levels in the compressional wave in order to provide compensation for variations other than ice buildup. Ultrasonic waves may be coupled directly from a transducer to the airfoil plate or via an ultrasonic waveguide interposed between the transducer and the plate. The receiver for the ultrasonic waves to be detected may be positioned to receive direct flexural waves transmitted over a distance through the plate or flexural waves reflected from reflecting boundaries in the plate.

Other patents directed to overcoming the problem of detecting icing on aircraft are listed in the enclosed listing of prior art.

The known art suffers from various drawbacks such as high cost, complexity, weight, high current drain, an inability to differentiate between rime and clear ice and generally lack of dependability in indicating ice formation, especially at the early phases of ice formation when it is extremely critical for a pilot to be warned while there is still time to take evasive action.

It is accordingly an object of the present invention to provide an aircraft icing sensor which overcomes the drawbacks of the known devices of this type, and which is especially directed to providing aircraft sensing apparatus that is of light weight, low complexity, a high degree of dependability and has low power drain and is ergonomically suited for an environment such as an aircraft cockpit.

Further objects and advantages of this invention will be apparent from the following detailed description of a presently preferred embodiment, shown schematically in the accompanying drawings.

SUMMARY OF THE INVENTION

According to the invention, there is provided an icing detector for detecting presence of ice in air comprising an ice collecting surface facing an oncoming air stream; light emitting apparatus for emitting a light beam crossing the ice collecting surface, having a prismatic light refracting window for refracting the light beam in a first direction, when no ice is present on the ice collecting surface; light sensing apparatus in a path of the second direction, and annunciating apparatus coupled to said light sensing apparatus for annunciating presence of ice when light is sensed by the light sensing apparatus.

According to a further feature, there is provided an ice detector having a reflecting surface disposed in the second direction for reflecting the light beam in direction of the light sensing apparatus.

According to a still further feature, there is provided an ice detector wherein the light emitting apparatus includes a light source, a transmitting light conductor having a light entry end for receiving light from the light source and a light exit end forming the light refracting window.

According to another feature, there is provided an icing detector having, a detector body having the ice collecting surface formed therein, a first upstanding wall disposed at one side of the ice collecting surface having the light emitting apparatus and the light receiving apparatus mounted therein, and a second upstanding wall disposed oppositely the first upstanding wall having the reflecting surface formed therein, facing the first upstanding wall.

According to still another feature, there is provided an icing detector including an electronic light sensor, wherein the light sensing apparatus include a receiving light conductor having a light receiving end disposed in the first upstanding wall, and a light exit end coupled to the electronic light sensor, wherein the electronic light sensor is disposed away from the detector body.

According to an additional feature, there is provided an icing detector, wherein the reflecting surface is formed with a concave curvature facing the first wall for focusing the light on the light sensing apparatus, and wherein further the light refracting window is formed as a slanted planar cut through the first light conductor, the slanted planar cut having a normal substantially parallel with the ice collecting surface.

The icing detector according to the invention may include in the light sensing apparatus a photo diode photonically coupled to the light exit end of the second light conductor, an electronic detecting circuit having an input connected to the photo diode for detecting presence of light received by the photodiode, and an output connected to an electronic circuit having a "clear ice" output, the electronic circuit being operative for activating the "clear ice" output upon presence of light being sensed by the light sensing apparatus, and wherein the electronic circuit includes a threshold circuit and a "rime ice" output wherein the "rime ice" output is activated when the ice sensing detector receives a light input having a light level below the threshold.

Furthermore, the icing detector, may include a "no ice" output of the electronic circuit, a NOR-gate having two inputs respectively connected to the "clear ice output" and to the "rime ice output," and an output forming the "no ice" output when no ice is present on the collecting surface.

As an additional feature of the invention the annunciating apparatus may include an annunciator operative for annunciating at least one of the conditions "clear ice", "rime ice" and "no ice", and wherein the annunciating apparatus is operative for annunciating at least one of the modes: acoustic mode, optical display mode and vibrating mode.

The icing detector may include mounting apparatus for mounting the icing detector on an aircraft, but other uses of the icing detector are contemplated, which may include mounting, for example, inside a fuel tank for indicating a fuel level, without the need for introducing electrical wires in the fuel tank, thereby providing an explosionproof level indicator.

According to the invention the icing detector may be used for aircraft and other craft having a forward-facing surface forming an air gap for collecting ice and facing the oncoming air stream. The detector includes a light-transmitting body for transmitting a light beam across the forward facing surface, impinging on a reflecting wall, and a light receiver for receiving a reflected light beam when no ice is present on the ice collecting surface.

A light transmitter is disposed behind the light transmitting body for transmitting a light beam through an upstanding wall at a given angle thereto; a light receiver is disposed relative to the transmitted light beam such as to receive the light when reflected from the reflecting surface.

When there is no ice in the detector's forward facing surface, some amount of light from the light source will spill outside the air gap because of a slanted prism face at the air/ice interface. This reduces, by an analogous amount, the amount of light reflected from the reflecting wall back to the light receiver. This amount of reflected light is called the "NO ICE" signal level.

When rime ice (which is opaque) forms in the transducer's air gap, it further decreases the degree of light intensity reflected back into the receiver. If this further reduced amount of light falls below a given threshold, it indicates the presence of RIME ICE.

When clear ice forms in the detector's air gap, the clear ice's refractive index being u=1.31 causes some of the previously-spilled light to be directed to the reflecting surface . This increases the amount of light reaching the light receiver. If this amount of light surpasses an upper threshold, it indicates presence of CLEAR ICE.

Signal deviation thresholds for rime and clear ice alarms are determined by the ratios of resistors A/B (RIME ICE) and resistors C/D (CLEAR ICE), while the NO ICE signal is logically true in the absence of either of the two foregoing signals, as determined by a NOR gate.

Further objects and advantages of this invention will be apparent from the following detailed description of a presently preferred embodiment, shown schematically in the accompanying drawings.

BRIEF DESCRIPTION OF THE FIGURES

FIG. 1b is a transverse part cross-sectional view of the detector body according to FIG. 1a, seen along the line 1b of FIG. 1a;

FIG. 1c is an elevational cross-section of the icing detector body seen along the lines 1c—1c of FIG. 1a.

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENTS

Figure 1A:
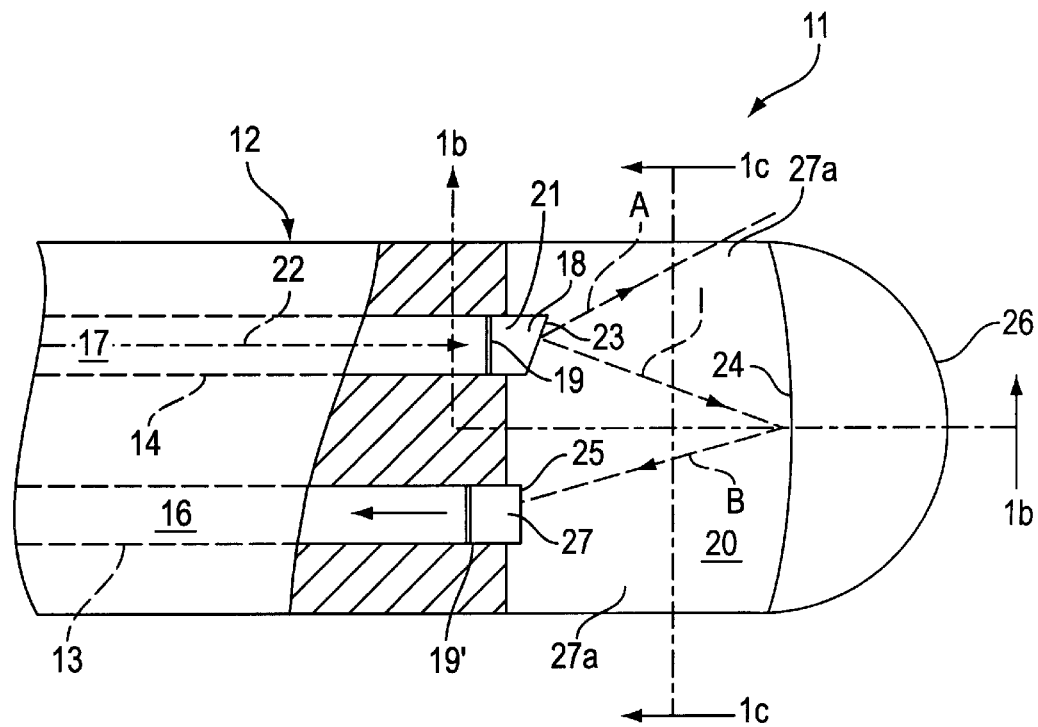
FIG. 1a is an elevational sectional view of the icing detector showing details of the detector body, ends of two light conductors, an ice collecting surface, and the reflector.
Figure 1B:
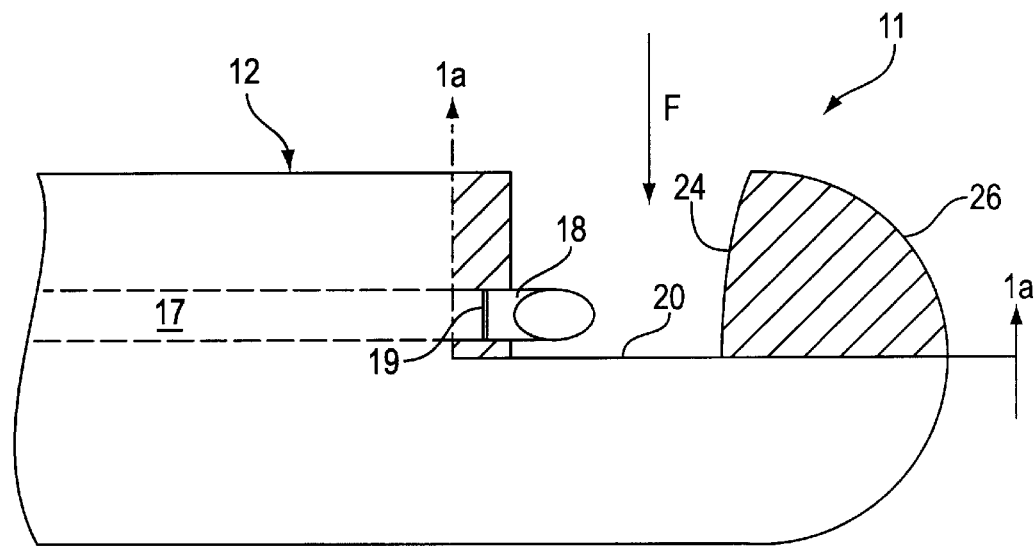

FIGS. 1a and 1b show the icing detector 11 according to the invention, in respective partially cross-sectional views.

The detector body 12 may be arranged to be mounted externally on the skin of an aircraft facing forwardly as indicated by arrow F in FIG. 1*b* facing the oncoming air stream when the aircraft is in flight. The detector 11 is shown as having its cylindrical body 12 having two internal axially oriented cylindrical holes 13 and 14, each holding a respective outer end of respective light conductors 16 and 17, in the following identified respectively as the receiving and transmitting light conductor. The transmitting light conductor 17 is connected to a conveniently located light source, e.g. a light-emitting laser diode not shown in this view. The outer end 18 of the transmitting light conductor 17 is coupled via an optical coupling layer 19 of transparent cement. The light continues through a light-transmitting body 21 from where a light beam exits through a slanted surface 23, having its normal N slanted at a given angle α to the axis 22 of the light transmitting body 21. As the light beam exits the light transmitting body 21 through the slanted surface 23 when no ice is present, it follows a direction substantially as indicated by arrow A, which indicates the general direction of the light when it exits into air, as will be described in more detail below in connection with FIG. 2.

An ice collecting surface 20 is formed in the detector body 12, in which ice will collect under flight in icing conditions If, however, clear ice is forming on the ice-collecting surface 20 and the slanted surface 23, the exiting light will be refracted by the layer of ice to follow a direction indicated by arrow I, in which case it will increase the illumination of a reflecting surface 24 on the inside of a dome 26 projecting forwardly of the detector body 12. Due to the curvature of the reflecting surface 24, the reflected light beam indicated by arrow B is reflected back to the end 25 of the receiving light conductor 16. In order to provide an air and fluid-tight seal, a sealing cylinder 27 may be inserted in the outer end of the cylindrical hole 13, and coupled to the receiving light conductor 16 through a transparent sealing layer 19'. The dome 26 may advantageously have air exit openings 27*a* to maintain laminar flow of air from the interior of the dome 26

Figure 1C:
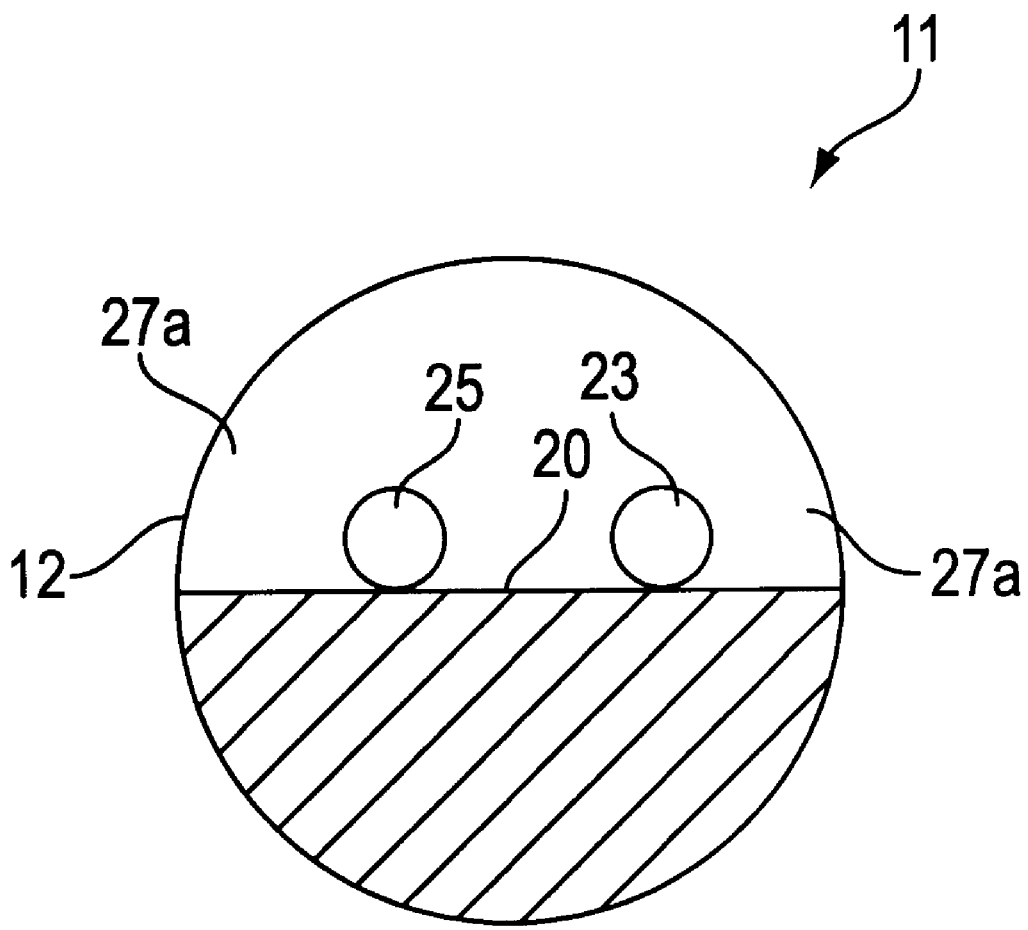

FIG. 1*c* is a cross-section of the detector body 12, seen along line 1*c*—1*c* of FIG. 1*a*.

FIG. 2 details a,b,c and d serve to illustrate the exit angle of a transmitted light beam indicated by arrow L under conditions of varying slant of the slanted exit surface 23, and presence or absence of ice or other refracting medium, such as e.g. fuel in a fuel tank or the like, ahead of the slanted prismatic window 23.

From the optical sciences it is known from the law, known as Snell's Law, that for a light beam crossing a surface at an incoming angle i, and an outgoing refracted angle r, wherein the surface divides two transparent media having different refractive indices, the following equation holds that $$\sin i/\sin r = n,$$

wherein n is a constant. The refractive index is a measure of the relative velocity of light in that medium. The refractive index for water is 1.333, for air 1.00029, and for clear ice 1.31.

Figure 2D:
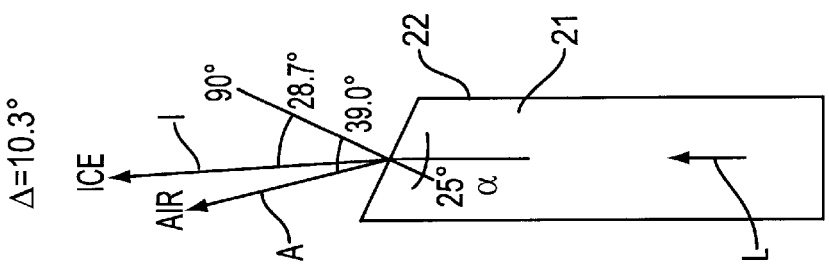
FIG. 2a, b, c, and d is a set of diagrammatic views of the slanted end of the light transmitting body with various degrees of slant and a refracted light beam issuing at different angles from the slanted surface, with and without ice.
Figure 2C:
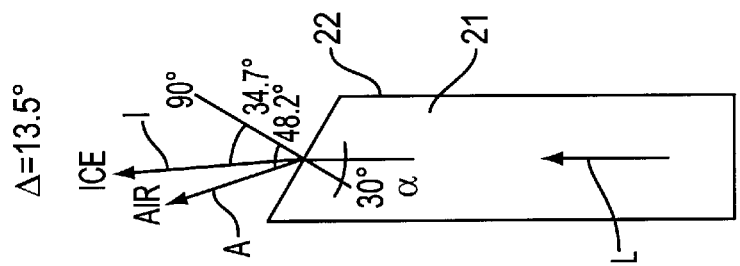
Figure 2B:
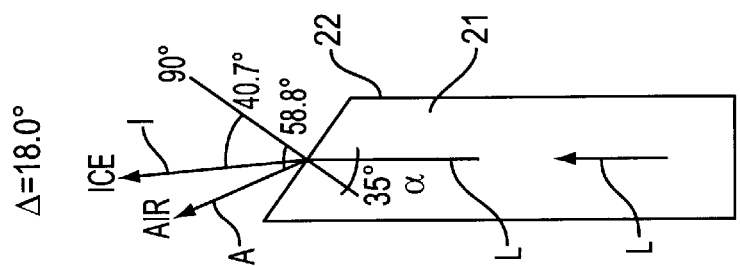
Figure 2A:
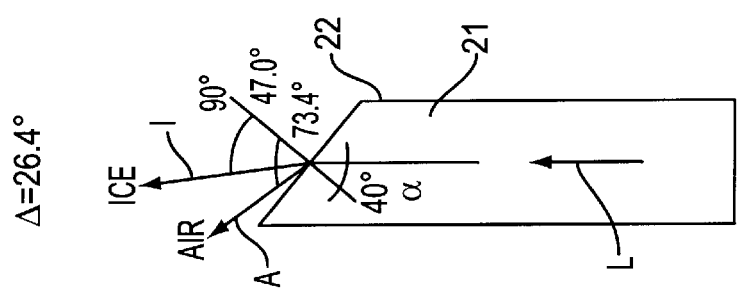

In FIG. 2*a*, the normal of the surface 23 to light beam L is shown as 40° angle α, while the refracted angle to a light beam I in ice is 47.0° and beam A to air 73.4°. In FIG. 2*b* the normal of the slanted surface is 35°, and the angles to refracted light beams A (air) and I (ice) from the normal are respectively 58.8° and 40.7°. In FIG. 2*c* angle α is 30°, and the angles to light beams A (air) and I (ice) are respectively 48.2° and 34.7° and in FIG. 2*d* respectively 39° and 28.7°.

Figure 7:
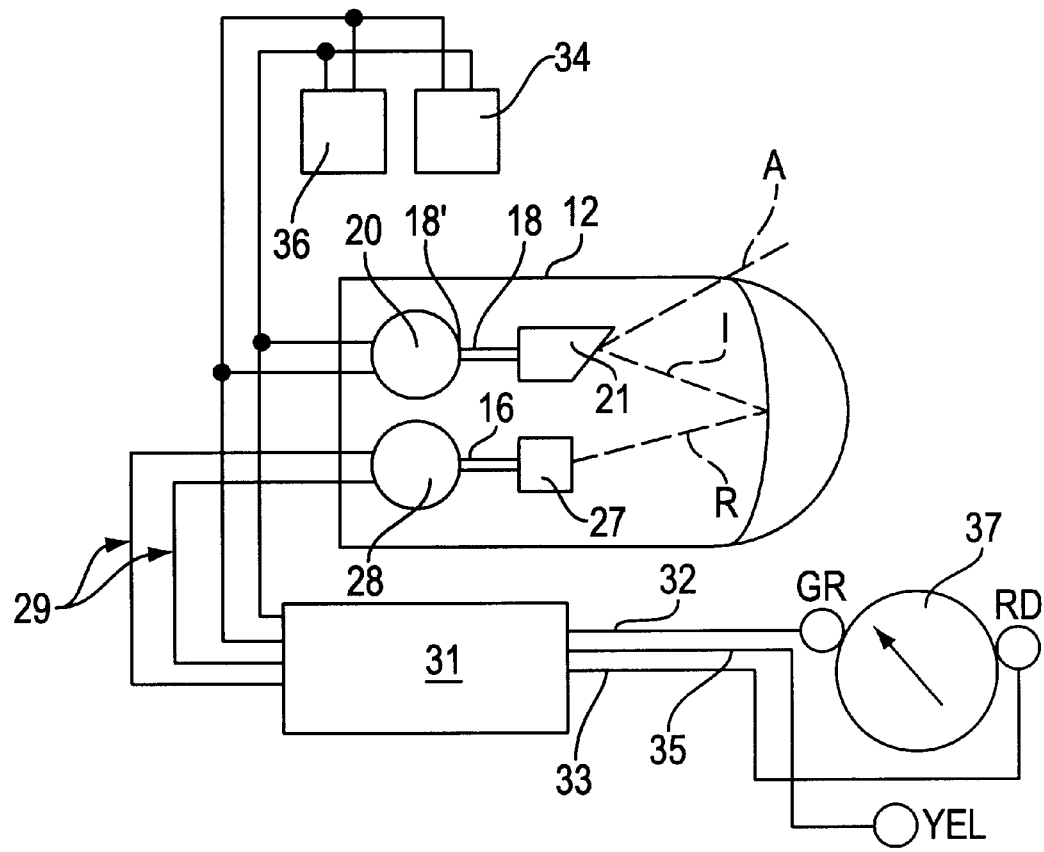
FIG. 7 is a systems diagram of the icing detector according to the invention.
Figure 9:
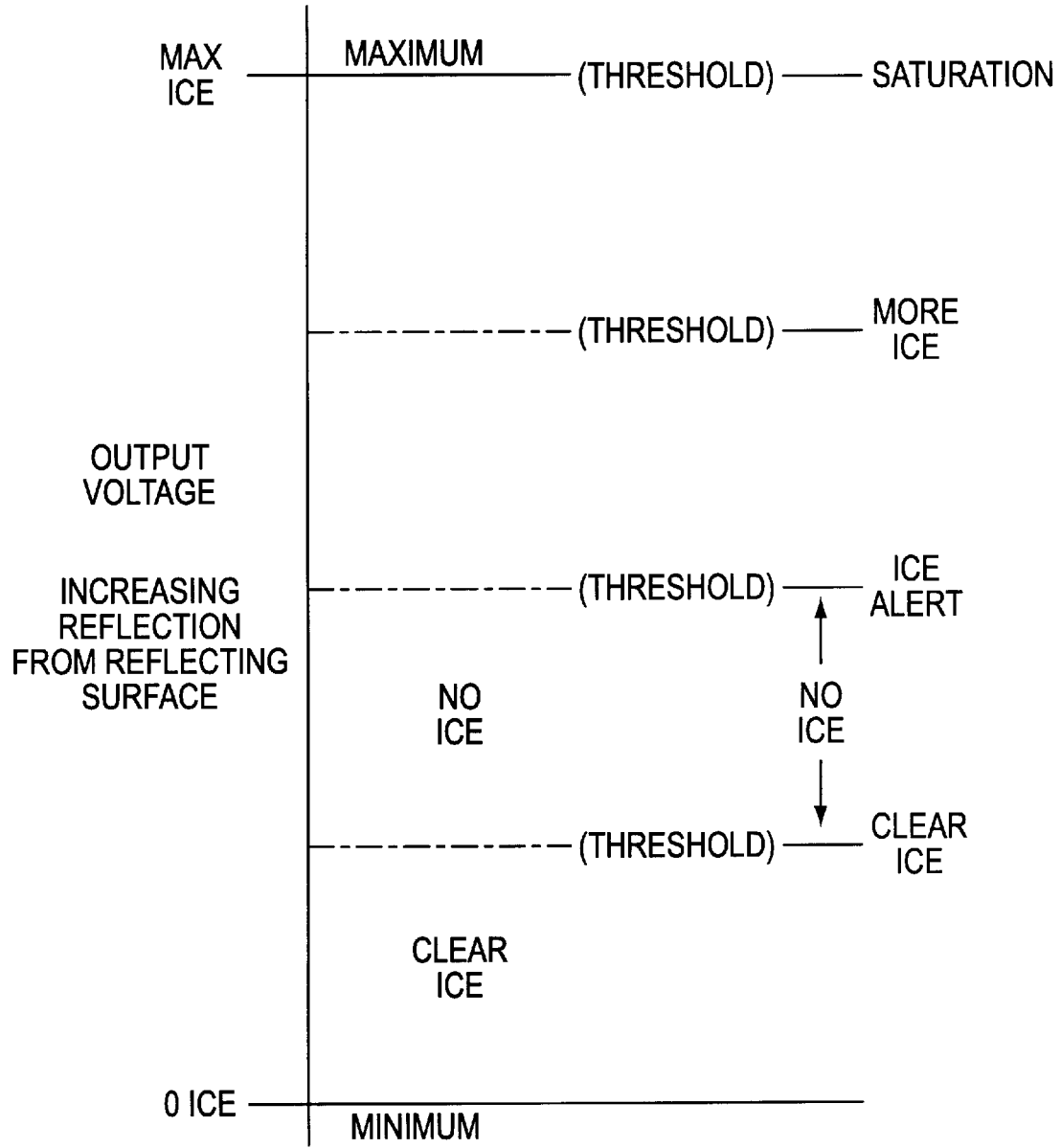
FIG. 9 is a diagrammatic view showing the relation between ice formation and the output of the icing detector.

It follows that the light sensor arrangement shown in FIG. 1*a*, 1*b* and 1*c* will perform as an excellent ice detector for example on an aircraft when mounted on the aircraft when pointed with its ice collecting surface 20 in direction F facing the oncoming air stream, and icing forms in the space above, i.e. forward of the light transmitting body 21. In that case, light beam I is refracted, as seen in FIG. 1*a*, by the ice and increases its illumination of the reflecting surface 24 back to the sealing cylinder 27 which couples the reflected light through the receiving light conductor 16 to a suitable light sensor 28 as shown in FIG. 7, which is positioned e.g. in the icing detector body 12. The light sensor 28 is connected by electric conductors 29 to an electronic discriminator circuit 31 having outputs 32, 33, 35 respectively connected to an annunciating apparatus shown as an example as LED's GR, RD and YEL, respectively indicating e.g. clear ice, rime ice and no ice. It follows that acoustic signals can be provided to augment the visual signals and/or recorded messages may be used. A vibrator connected to the control stick may also be used as an alerting indication.

The indicator lights GR, YEL and RD are preferably positioned in the aircraft cockpit within the visual range of the pilot, e.g. within the pilot's peripheral visual range.

The visual indicators GR, YEL and RD may be arranged to emit light signals in various modes or patterns. In one pattern, the green light stays on in a steady light mode when no icing is present, while the red light is off. In the Icing Alert mode the green light GR goes dark while the red light RD goes on, preferably in a flashing mode. In a different pattern the red and green light both flash in an alternating mode. The yellow light YEL will be on in the no-ice condition.

A light emitter 20*a*, e.g. a LED diode, is optically coupled to the distal end 18' of the transmitting light conductor 18.

The electric power supply for the circuit shown in FIG. 7 is advantageously obtained from an electric storage cell 34, e.g. a NiMH cell or the like. In order to avoid drawing power from the aircraft's electric system a solar cell 36, mounted on an inside window of the aircraft may be provided to keep the storage cell 34 charged.

Figure 3:
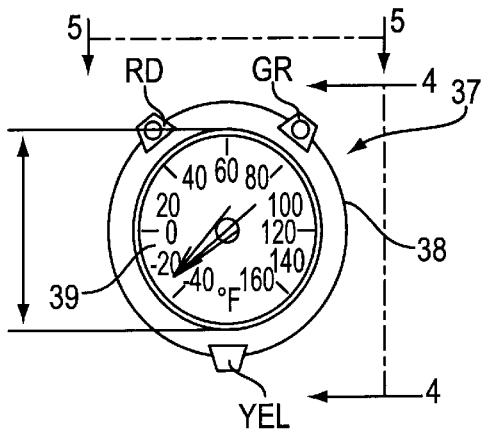
FIG. 3 is a face view of a thermometer with attached light indicators for showing various icing and non-icing conditions.
Figure 4:
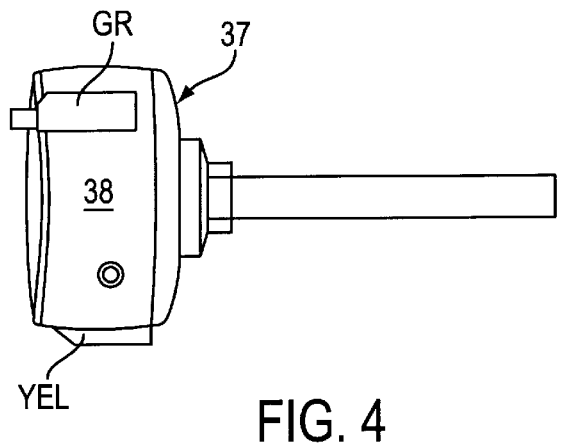
FIG. 4 is a side view of the thermometer according to FIG. 3, seen along the line 4—4 of FIG. 3.
Figure 5:
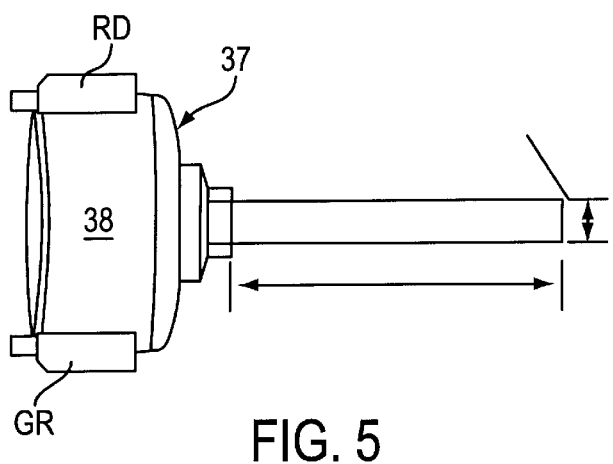
FIG. 5 is a top-down view of the thermometer according to FIG. 3, seen along the line 5—5 of FIG. 3.

In FIG. 7 the indicator lights GR, YEL and RD are mounted on a conventional bimetallic thermometer dial 37, for example on the rim 38 of the thermometer dial 38, as shown in FIGS. 3,4 and 5.

FIG. 3 is a face view of the thermometer dial 39, showing the light indicators RD, YEL and GR mounted forward-facing on the thermometer rim 38. FIG. 4 is a side view of the thermometer 38 seen along line 4—4 of FIG. 3. FIG. 5 is a top-down view of the thermometer 37 seen along the line 5—5 of FIG. 3, showing the light indicators RD and GR in forward facing position.

Figure 6:
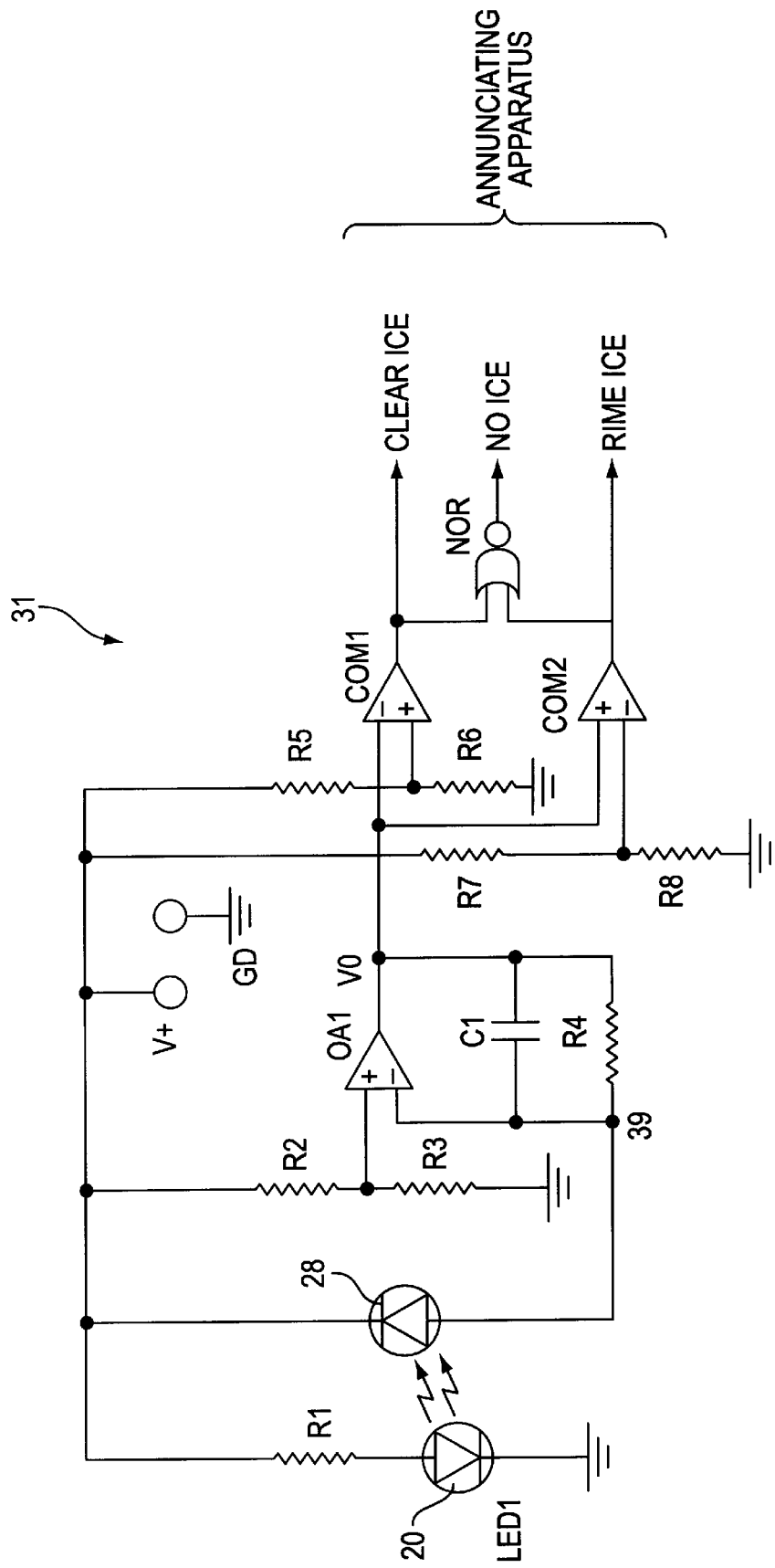
FIG. 6 is a circuit diagram of an electronic detecting and annunciator apparatus.
Figure 8:
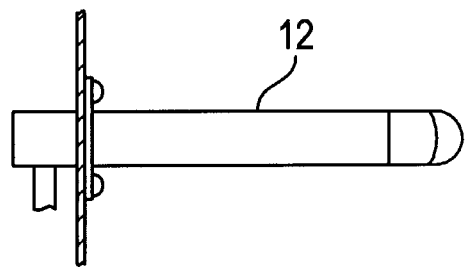
FIG. 8 shows an exemplary mounting device for aircraft mounting of the detector.

FIG. 6 is a circuit diagram of the discriminator circuit 31, wherein a light emitting diode LED1 is the light emitter or laser diode 20*a* shown in FIG. 7, which is coupled via light conductor 18 and the light transmitting body 21 to generate the outgoing light beam A when no ice is present or the refracted light beam I when ice is present as described above. When ice is present, the reflected light beam returns via the sealing cylinder 27 and is conducted via the receiving light conductor 16 to be detected by the light-sensing photo diode 28, as described above.

The zig-zag arrow symbol between the LED 20 and the light sensor 28 symbolizes the optical light path through the ice detector housing 12 as described above. The receiving light sensor 28 is connected to the inverting input of operational amplifier OA1, which is biased to operate as a conventional op-amp, such as type LM-741 from National Semiconductor, Inc.

When air (no ice) is present in the sensor air gap, the resistive divider R2/R3 biases the output level of OA1 to be in its mid-range. Neither COMPARATOR 1 nor COMPARATOR 2 is turned on. Both inputs to the NOR gate are false, and so its output is TRUE, indicating a no-ice state.

When clear ice is present in the air gap, the light return signal is intensified due to the additional illumination refracted onto the reflecting wall. The op-amp's output signal (Vo) therefore intensifies (actually becomes more negative, since the signal is connected to the op-amp's inverting input). Vo then crosses the detector's lower threshold established by the resistive divider R5/R6, and causes the output of COM 1 to go TRUE. This asserts the CLEAR ICE signal, and also negates the NO ICE signal from the NOR gate.

When opaque rime ice is present in the air gap, it obstructs the light return signal from the reflecting wall. The op-amp's output signal (Vo) therefore diminishes (actually becomes more positive, since the signal is connected to the op-amp's inverting input). Vo then crosses the detector's upper threshold established by the resistive divider R7/R8, and causes the output of COM 2 to go TRUE. This asserts the RIME ICE signal and negates the NO ICE signal from the NOR gate.

COM 1 and COM 2 outputs are mutually exclusive because the op-amp output signal Vo is connected to COM 1's inverting input, and to COM 2's non-inverting input.

I claim:

1. An icing detector for detecting presence of ice in air comprising an ice collecting surface facing an oncoming air stream;

light emitting means for emitting a light beam crossing said ice collecting surface, having a prismatic light refracting window for refracting said light beam in a first direction, when no ice is present on the ice collecting surface and in a second direction when clear ice is present on the ice collecting surface; and light sensing means in a path of said second direction, and annunciating means coupled to said light sensing means for annunciating presence of ice when light is sensed by said light sensing means.

2. An icing detector according to claim 1 including a reflecting surface disposed in said second direction for reflecting said light beam in a direction of said light sensing means.

3. An icing detector according to claim 1, wherein said light emitting means include a light source, a transmitting light conductor having a light entry end for receiving light from said light source and a light exit end forming said light refracting window.

4. An icing detector according to claim 3, including a detector body having said ice collecting surface formed therein, a first upstanding wall disposed at lone side of said ice collecting surface having said light emitting means and said light receiving means mounted therein, and a second upstanding wall disposed oppositely said first upstanding wall having said reflecting surface formed therein, facing said first upstanding wall.

5. An icing detector according to claim 4, including an electronic light sensor, wherein said light sensing means include a receiving light conductor having a light receiving end disposed in said first upstanding wall, and a light exit end coupled to said electronic light sensor, wherein said electronic light sensor is disposed away from said detector body.

6. An icing detector according to claim 4, wherein said reflecting surface is formed with a concave curvature facing said first wall for focusing said light on said light sensing means.

7. An icing detector according to claim 3, wherein said prismatic light refracting window is formed as a slanted planar cut through said first light conductor, said slanted planar cut having a normal substantially parallel with said ice collecting surface.

8. An icing detector according to claim 5, including in said light sensing means a photo diode coupled to said light exit end of said receiving light conductor, an electronic detecting circuit having an input connected to said photo diode for detecting presence of light received by said photodiode, and an output connected to an electronic circuit having a "clear ice" output, said electronic circuit operative for activating said "clear ice" output upon presence of light being sensed by said light sensing means.

9. An icing detector according to claim 8, wherein said electronic circuit includes a threshold circuit and a "rime ice" output wherein said "rime ice" output is activated when the ice sensing detector receives a light input having a light level below said threshold.

10. An icing detector according to claim 9, including a "no ice" output of said electronic circuit, and a NOR-gate having two inputs respectively connected to said "clear ice output" and said "rime ice output," and an output indicating "no ice" when neither clear ice nor rime ice is active.

11. An icing detector according to claim 1, including annunciating means having an annunciator operative for annunciating at least one of the conditions "clear ice", "rime ice" and "no ice".

12. An icing detector according to claim 11, wherein said annunciating means are operative for annunciating in at least one of the modes: acoustic mode, optical display mode and vibrating mode.

13. An icing detector according to claim 1, including mounting means for mounting the icing detector on an aircraft.

14. An icing detector according to claim 1, wherein said icing detector is adapted for detecting icing in a carburetor.

15. An icing detector according to claim 1, wherein said detector is adapted for detecting ice formation on a pitot tube.

16. An icing detector according to claim 1, adapted for detecting fuel level in a fuel tank.

17. An icing detector according to claim 1, having small dimensions so as to efficiently attract ice formation.

* * * * *